United States Patent [19]
Brown

[11] 3,941,009
[45] Mar. 2, 1976

[54] SHIFT LEVER HANDLE
[76] Inventor: George Seward Brown, 120 S. Main St., West Bridgewater, Mass. 02324
[22] Filed: July 18, 1974
[21] Appl. No.: 489,831

[52] U.S. Cl................. 74/473 R; 74/491; 74/543; 200/61.88
[51] Int. Cl.²........................................ B60K 20/00
[58] Field of Search....... 74/473 R, 471 R, 471 XY, 74/491, 543; 200/61.88, 61.85

[56] References Cited
UNITED STATES PATENTS
| | | | |
|---|---|---|---|
| 1,691,417 | 11/1928 | Ward | 200/61.88 |
| 2,860,522 | 11/1958 | Howlett | 74/473 |
| 3,260,826 | 7/1966 | Johnson | 74/471 XY |
| 3,701,288 | 10/1972 | Jordan | 74/471 X |
| 3,774,468 | 11/1973 | Kimsey | 74/473 R |

*Primary Examiner*—Benjamin W. Wyche
*Assistant Examiner*—Randall Heald

[57] ABSTRACT

A shift lever handle comprising a generally U-shaped member, one leg of which comprises an elongated handle grip, the other leg of which has means at the end thereof adjacent the end of said one leg for receiving thereon a shift range selector and having thereon as well means for mounting said handle on a shift lever.

2 Claims, 3 Drawing Figures

U.S. Patent  March 2, 1976  3,941,009
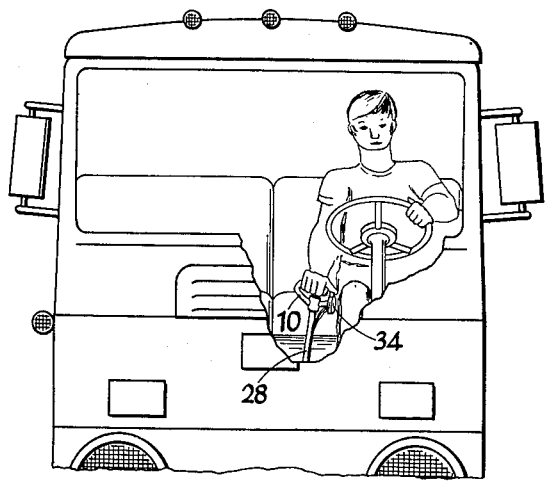
figure 1
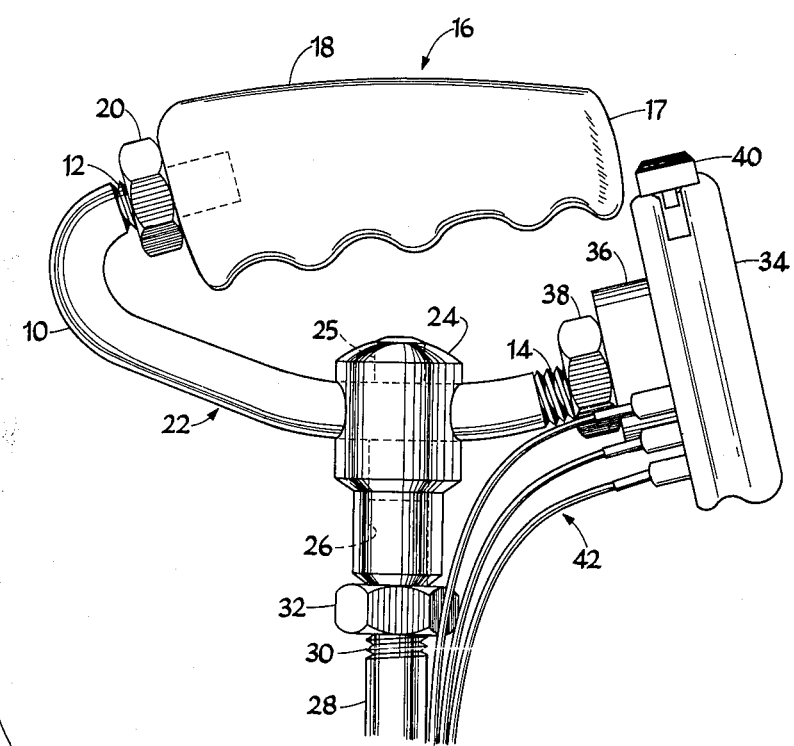
figure 2
figure 3
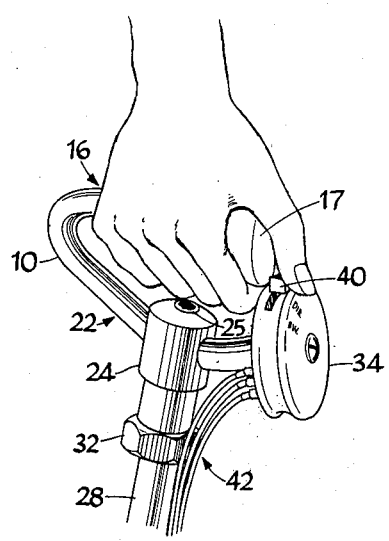

SHIFT LEVER HANDLE

This invention relates to a shift lever handle and more particularly to a handle adapted to be attached to the shift lever of a transmission having multiple shift ranges which are pneumatically selected.

In multiple shift range transmissions of the type employed in large truck rigs, which may have as many as thirteen speeds, a pneumatic shift range selector is employed also as a shift lever handle. The shift range selector comprises a generally disc shaped member and has a range selector lever on the periphery thereof.

It is a principal object of the present invention to provide a more comfortable shift lever handle which conveniently locates the range selector lever in proximity thereto but in a position to avoid accidental actuation thereof. It is another object of this invention to provide a shift lever handle which is readily installed to replace and receive the shift range selector.

In general the invention features a shift lever handle comprising a U-shaped member. One leg of the U comprises an elongated handle grip. The other leg of the U selector mounting means on the end thereof adjacent the end of said one leg to receive the shift range selector and also has thereon shift mounting means for mounting the handle on a shift lever.

In preferred embodiments, the legs of the handle are spaced apart a distance approximately equal to the distance between mounting means on the shift range selector and the range selector lever thereof; the selector mounting means comprises a threaded shaft; the shift mounting means comprises an internally threaded member; the axis of the threaded portion of the threaded member intersects the said one leg; and a shift range selector is mounted on the selector mounting means with a range selector lever adjacent the end of the one leg.

Other objects, features and advantages of the present invention will be apparent to those skilled in the art from the following detailed description of a preferred embodiment thereof taken together with the accompanying drawings in which:

FIG. 1 is a partial front view of a truck employing the invention;

FIG. 2 is a side elevation of a shift lever handle according to the present invention, mounted to a shift lever and having a shift range selector mounted thereon; and FIG. 3 is an isometric view of the shift lever handle and shift range selector in use.

With reference now to the drawings, and particularly FIG. 2 thereof, the invention comprises a shift lever handle having a generally U-shaped configuration. The handle comprises a metal rod 10 which is bent to the U-shape. Rod 10 is threaded on each end thereof 12, 14. One leg 16 of the U includes a plastic hand grip 18 which is threadedly connected to one end 12 of rod 10. A locknut 20 secures the hand grip 16 in position.

The other leg 22 of the handle extends at its end 14 to the same extent as the outer end 17 of handle grip 18. Leg 22 extends through a member 24 mounted thereon. Member 24 is secured to leg 22 by set screw 25. Member 24 has an internally threaded aperture 26 therein at right angles to legs 16, 22 the axis of which intersects both legs.

As shown in FIG. 2, the threaded end 30 of a truck shift lever 28 is threadedly engaged in aperture 26 of member 24. Locknut 32 secures the shift lever and handle together.

A shift range selector 34 having threaded mounting means 36 is threadedly engaged to the end 14 of said other leg 22. Locknut 38 secures shift range selector 34 in position with range selector lever 40 thereof immediately adjacent hand grip 18, legs 16, 22 being spaced apart a distance approximately equal to the distance between mounting means 36 and lever 40. Pneumatic lines, generally designated 42 are connected to the shift range selector.

The orientation of hand grip 18 may be adjusted by loosening locknuts 20 and 32 and adjusting the position of hand grip 18 and the handle and then tightening the locknuts.

As shown in FIGS. 1 and 3, in use, a driver's hand is placed on hand grip 18. The driver's thumb extending over the end 17 of grip 18 engages lever 40 of shift range selector 34 whereby the shift range may be readily changed.

Other embodiments of this invention will occur to those skilled in the art which are within the scope of the following claims.

What is claimed is:

1. A shift lever handle comprising, in combination, a connector member for mounting to the top of a vertical gear shift lever and a generally U-shaped member, the legs thereof extending generally horizontally and lying substantially in the same vertical plane, the lower leg having a central portion secured to said connector member, the free end of said lower leg extending beyond said connector to define a mount for a range selector, said mount positioning said selector adjacent the end of the upper leg, said upper leg defining an elongated handle grip such that when the hand of an operator engages said handle grip in operative fashion, the selector is simultaneously operable by thumb movement of the same hand.

2. The shift lever handle of claim 1 wherein said lower leg is a rod of constant dimension throughout its length, the central portion of said rod passing through a generally horizontal axis hole, and a lock means securing said rod in said hole.

* * * * *